United States Patent Office 2,860,061
Patented Nov. 11, 1958

2,860,061
COMPOSITION AND PROCESS FOR MANUFACTURING CEMENT

Thorbjorn Heilmann, Copenhagen, Denmark, assignor to F. L. Smidth & Co., New York, N. Y., a corporation of New Jersey No Drawing. Application December 7, 1955
Serial No. 551,524

Claims priority, application Great Britain
December 7, 1954

4 Claims. (Cl. 106—100)

The present invention relates to the manufacture of cement, and is more particularly concerned with a novel mixture of raw materials for use in cement production and with a process for producing cement, in which the new mixture is utilized.

In the manufacture of cement as now carried on by either the wet or dry processes, the cement raw material is converted into nodules before it is burned. In the dry process, moisture is usually added to the raw material and the latter is then agitated in a drum to form nodules containing moisture in an amount usually ranging from 10% to 15%. These nodules are then fed into a rotary kiln, where they are burned to clinker. In the wet process, the cement raw material is introduced into the kiln in the form of slurry, and, as the slurry travels down the kiln, the moisture is progressively evaporated and the material is formed into nodules as a result of the tumbling and agitation of the material in the kiln.

In both the wet and dry processes, it has been found that nodules made as described from some raw materials are weak and lacking in cohesion, so that, as such nodules move down the kiln, they are rapidly worn down by abrasion. This action is highly objectionable because of the formation of dust, which is carried out of the kiln with the burned gases.

The cement raw material of the invention produces strong nodules by reason of including a small proportion of a substance, which swells when moistened and shrinks on subsequent drying. The additional strength imparted to the nodules by the substance probably results from the internal tension developed in the nodules as the substance shrinks during the heating of the nodules in the kiln.

A substance, which has the desired properties, is the mineral montmorillonite, which is found in various clays and like minerals as, for example, bentonitic clays and fuller's earth. Any of the minerals containing montmorillonite can be used in the production of the cement raw material of the invention and the substance may be added at various stages in the preparation of the raw material, as, for example, in a wash mill, a grinding mill, a nodulizing drum, or a homogenizing apparatus. The substance may also be fed into the inlet end of the kiln as a dry powder and, if the material is added in this way, when the raw material is a slurry, the addition of the substance will not effect the proportion of water to solid material in the slurry.

The improvement obtained by the addition of the substance which strengthens the nodules is shown by the results of tests for determining the strength of nodules of various kinds. Such tests are carried on by rolling the nodules in a small drum, since this operation has been found by experience to provide a reliable basis of comparison with the abrasion to which nodules are subjected in a rotary kiln. In the tests, the time required for effecting a reduction of 1 mm. in the diameter of a nodule being rolled in the drum is noted and the stronger the nodules are, the longer is the time required to effect the reduction in size. The nodule strengths are determined at temperatures of both 150° C. and 850° C., in order to ascertain the effect on the nodules of exposure to the widely differing temperatures.

In actual tests, the basic cement raw material used was of the following composition:

| | Percent by weight |
|---|---|
| Limestone | 83 |
| Shale | 15 |
| Sand | 2 |

Nodules of this composition with a water content of 14.5% were found by test to have a nodule strength as follows:

Strength at 150° C. _____ 3.6
Strength at 850° C. _____ 6.5

These figures indicate that the nodules tested at 150° C. were reduced in diameter by 1 mm. in 3.6 units of time, while it required 6.5 units of time to effect a similar reduction in diameter of the nodules tested at 850° C.

When varying amounts of the shale were replaced by equal amounts of bentonite of two different kinds, the nodules were found to have the strengths as shown in the following table:

Part I

| | 83% limestone 14.5% shale 2% sand 0.5% bentonite | | | 83% limestone 14% shale 2% sand 1% bentonite | | |
|---|---|---|---|---|---|---|
| | Strength | | Percent water in nod. | Strength | | Percent water in nod. |
| | 150° | 850° | | 150° | 850° | |
| Bentonite I | 6.8 | 8.4 | 13.0 | 9.1 | 8.9 | 13.5 |
| Bentonite II | 6.6 | 7.8 | 14.0 | 9.0 | 9.7 | 13.0 |

Part II

| | 83% limestone 13% shale 2% sand 2% bentonite | | | 83% limestone 11% shale 2% sand 4% bentonite | | |
|---|---|---|---|---|---|---|
| | Strength | | Percent water in nod. | Strength | | Percent water in nod. |
| | 150° | 850° | | 150° | 850° | |
| Bentonite I | 19.8 | 14.2 | 12.5 | 34.0 | 18.4 | 13.0 |
| Bentonite II | 23.2 | 15.8 | 12.5 | 37.0 | 19.0 | 12.5 |

The tests show that the addition to a cement raw material mix of as small an amount of bentonite as from ½% to 1% by weight of the mix produces a substantial improvement in the strength of the nodules and additions of bentonite of 2% and 4% produce further improvement. The increase in strength of the nodules is most pronounced at 150° C.

The advantages derived from the use of the additive are not limited to its employment with cement raw mixes, which contain shale, and it may be used with beneficial results with all the raw mixes commonly employed in the manufacture of cement.

I claim:

1. A composition for use in the formation of strong nodules of a material convertible by burning into a hydraulic cement of the class typified by Portland cement, which comprises a hydraulic cement raw material mix, to which has been added from ½% to 4% by weight of the mix of a mineral substance containing a substantial proportion of montmorillonite and having the property of swelling when moistened and shrinking on subsequent drying.

2. The composition of claim 1, in which the substance is bentonite.

3. The composition of claim 1, in which the substance is fuller's earth.

4. A process for manufacturing hydraulic cement of the class typified by Portland cement which comprises preparing a hydraulic cement raw material mix containing from ½% to 4% by weight of the mix of a mineral substance containing a substantial proportion of montmorillonite and having the property of swelling when moistened and shrinking on subsequent drying, nodulizing the mixture, and burning the nodules in a rotary kiln.

References Cited in the file of this patent

UNITED STATES PATENTS

| | | |
|---|---|---|
| Re. 17,207 | Collings | Feb. 5, 1929 |
| 1,629,714 | Kraus | May 24, 1927 |
| 1,955,121 | Folke et al. | Apr. 17, 1934 |
| 2,007,742 | Brown | July 9, 1935 |
| 2,073,105 | Hoffmann | Mar. 9, 1937 |
| 2,466,601 | Lellep | Apr. 5, 1949 |
| 2,587,044 | Hellmann | Feb. 26, 1952 |
| 2,627,399 | De Vaney | Feb. 3, 1953 |
| 2,776,828 | Marcellus | Jan. 8, 1957 |

FOREIGN PATENTS

| | | |
|---|---|---|
| 1,884 | Great Britain | Jan. 22, 1884 |
| 258,970 | Germany | Apr. 22, 1913 |
| 439,198 | Great Britain | Dec. 2, 1935 |

OTHER REFERENCES

See page 43 (Portland cement) of Technical Paper #609 of the U. S. Dept. of the Interior, Bureau of Mines, entitled Bentonite: Its Properties, Mining, Preparation and Utilization.